(12) United States Patent
Allen, Jr.

(10) Patent No.: US 6,495,973 B1
(45) Date of Patent: Dec. 17, 2002

(54) LIGHTING CONTROL SYSTEM AND METHOD

(76) Inventor: Charles W. Allen, Jr., P.O. Box 326, Cleveland, TN (US) 37310

( * ) Notice: Subject to any disclaimer, the term of this patent is extended or adjusted under 35 U.S.C. 154(b) by 0 days.

(21) Appl. No.: 09/907,220

(22) Filed: Jul. 17, 2001

(51) Int. Cl.[7] .................................................. G05F 1/00
(52) U.S. Cl. ...................... 315/302; 315/308; 315/312; 315/362; 315/149; 315/155
(58) Field of Search .................. 315/300, 302, 315/307, 308, 224, 312, 315, 316, 318, 325, 294, 360, 362, 149, 151, 158, 155

(56) References Cited

U.S. PATENT DOCUMENTS

| | | | |
|---|---|---|---|
| 4,360,742 A | | 11/1982 | Stokes |
| 4,701,669 A | * | 10/1987 | Head et al. .................. 250/205 |
| 4,855,649 A | | 8/1989 | Masaki |
| 4,929,872 A | | 5/1990 | Bridges et al. |
| 5,015,921 A | | 5/1991 | Carlson et al. |
| 5,309,084 A | | 5/1994 | Jiang |
| 5,365,162 A | | 11/1994 | Sundhar |
| 5,422,544 A | * | 6/1995 | Giddings et al. ........... 315/151 |
| 5,451,841 A | | 9/1995 | Dunn et al. |
| 5,701,058 A | * | 12/1997 | Roth ....................... 250/214 D |
| 5,895,986 A | * | 4/1999 | Walters et al. ......... 250/214 AL |
| 6,046,550 A | * | 4/2000 | Ference et al. ............. 315/291 |
| 6,188,181 B1 | * | 2/2001 | Sinha et al. ................. 315/293 |

OTHER PUBLICATIONS

US 6,034,516, 3/2000, Goerke et al. (withdrawn)

* cited by examiner

*Primary Examiner*—Haissa Philogene
(74) *Attorney, Agent, or Firm*—Dale J. Ream

(57) ABSTRACT

A lighting control system for maintaining a predetermined light level in a lighting zone illuminated by both natural and artificial light includes a CPU connected to an electrical power source and to an electric light. The CPU directs a predetermined initial amount of current to the electric light when the electric light is activated. The system includes a sensor for sensing the light level within the lighting zone and communicating the sensed level to the CPU. Following a comparison of the sensed light level with a predetermined light level, the CPU either increases or decreases the amount of current to the electric light for maintaining the predetermined light level. A thyristor connected to the CPU blocks and releases current flowing to the electric light for gradual power changes. Present light level sensing and current adjustments continue while the electric light is activated.

20 Claims, 5 Drawing Sheets

LIGHTING CONTROL SYSTEM AND METHOD

BACKGROUND OF THE INVENTION

This invention relates generally to lighting apparatuses and, more particularly, to a lighting system and method for maintaining a predetermined light level within a lighting zone that is illuminated by a combination of natural and electric light sources.

Maximizing the life of electric light bulbs, whether fluorescent or incandescent, is economically desirable. The failure of light bulbs may be due to the natural burning out of a bulb filament or failure of related hardware. Light bulbs are also subject to failure as a result of repeated energizing of the bulb to full voltage. Therefore, limiting the number of times a bulb is immediately energized to full power may increase bulb longevity as will energizing bulbs to the degree necessary to maintain a desired level of light.

Various devices and circuits have been proposed in the art for gradually energizing a light bulb so as to decrease the risk of immediate filament overload or to increase the longevity of a bulb. Although assumably effective for their intended purposes, the existing devices do not increase the bulb life by providing gradual current adjustments to a bulb while automatically adjusting current so as to maintain a predetermined light level within a room illuminated by both natural and artificial light sources.

Therefore, it is desirable to have a lighting control system that maximizes bulb life by automatically increasing or decreasing the amount of current flowing from an electrical power source to an electric light source so as to maintain a constant predetermined light level within a lighting zone. Further, it is desirable to have a lighting control system that gradually supplies electrical current to the electrical light source to maximize bulb life.

SUMMARY OF THE INVENTION

A lighting control system and method according to the present invention includes a control unit having a central processing unit (CPU) positioned therein. The control unit may be positioned in a room or other lighting zone that is illuminated by both natural sunlight and artificial light such as electric lamps. The CPU is electrically connected to an electrical power source such as an AC electrical power outlet. The CPU is also electrically connected to the electric lights, either directly or to the AC outlets into which the lights are plugged. The control unit further includes a light sensor for sensing the total amount of light within the respective room or lighting zone. The total amount of light may be quantitatively measured in lumens. The sensor is connected to the CPU and adapted to deliver sensed light level readings thereto.

The CPU includes a memory element capable of storing a predetermined light level. This level may be a default level or may be selected or input by a user. The CPU is also programmed to allow a predetermined amount of current from the electrical power source to flow to the electric light sources when those light sources are activated. Thereafter, the CPU compares a sensed light level reading with the predetermined light level and determines if the amount of current flowing to the light sources needs to be increased or decreased. If the sensed light level is less than the predetermined light level, then the CPU allows an increased amount of current to flow to the electric light sources. Similarly, the CPU allows less current to flow if the sensed light level is greater than the predetermined light level. Therefore, the total amount of light in the lighting zone is generally maintained at the predetermined level. For example, less artificial light is provided if the natural sunlight directed into the lighting zone increases and vice versa. This saves electricity and increases the longevity of the light bulbs, especially during peak periods of sunshine.

The control unit further includes a thyristor electrically connected to the CPU. As current flows from the electric power source toward the electric light sources, the thyristor cyclically blocks and releases the electricity at a predetermined rate such that the current is gradually received by the lights. Under CPU control, the predetermined rate changes such that the complete amount of current ultimately is being delivered to the electric lights. This gradual current adjustment also promotes longevity of the light bulbs.

Therefore, a general object of this invention is to provide a lighting control system which causes the illumination of electric lights within a lighting zone to gradually increase or decrease as the amount of natural light therein proportionately decreases or increases.

Another object of this invention is to provide a lighting control system, as aforesaid, that maintains a predetermined level of light in a room that is partially illuminated by natural light and partially illuminated by electric light sources.

Still another object of this invention is to provide a lighting control system, as aforesaid, which controls the rate at which electric lights are energized or de-energized.

Yet another object of this invention is to provide a lighting control system, as aforesaid, having a light sensor for sensing the level of light within a lighting zone.

A further object of this invention is to provide a lighting control system, as aforesaid, in which a desired level of light to be maintained within a lighting zone may be selected by a user.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

A lighting control system 10 according to a preferred embodiment of the present invention will now be described with reference to FIGS. 1 through 6 of the present drawings. The lighting control system 10 includes a control unit 12 having a generally rectangular housing that defines an interior space. Preferably, the control unit 12 is mounted into the wall of a room in a manner substantially similar to how electrical outlet boxes or light switch boxes are mounted (FIG. 1) although mounting the housing to a wall with fasteners would also work. A central processing unit (CPU)

Figure 1:
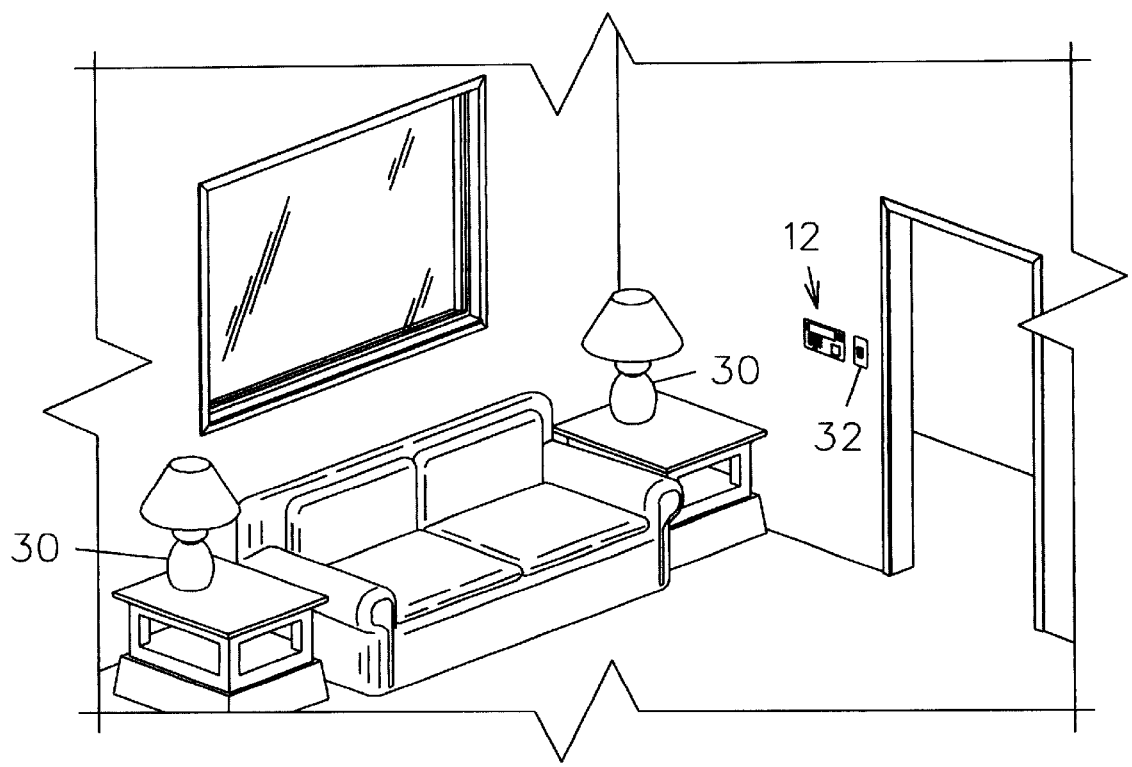
FIG. 1 is a fragmentary perspective view of a lighting control system according to the preferred embodiment of the present invention installed in a lighting zone.
Figure 2:
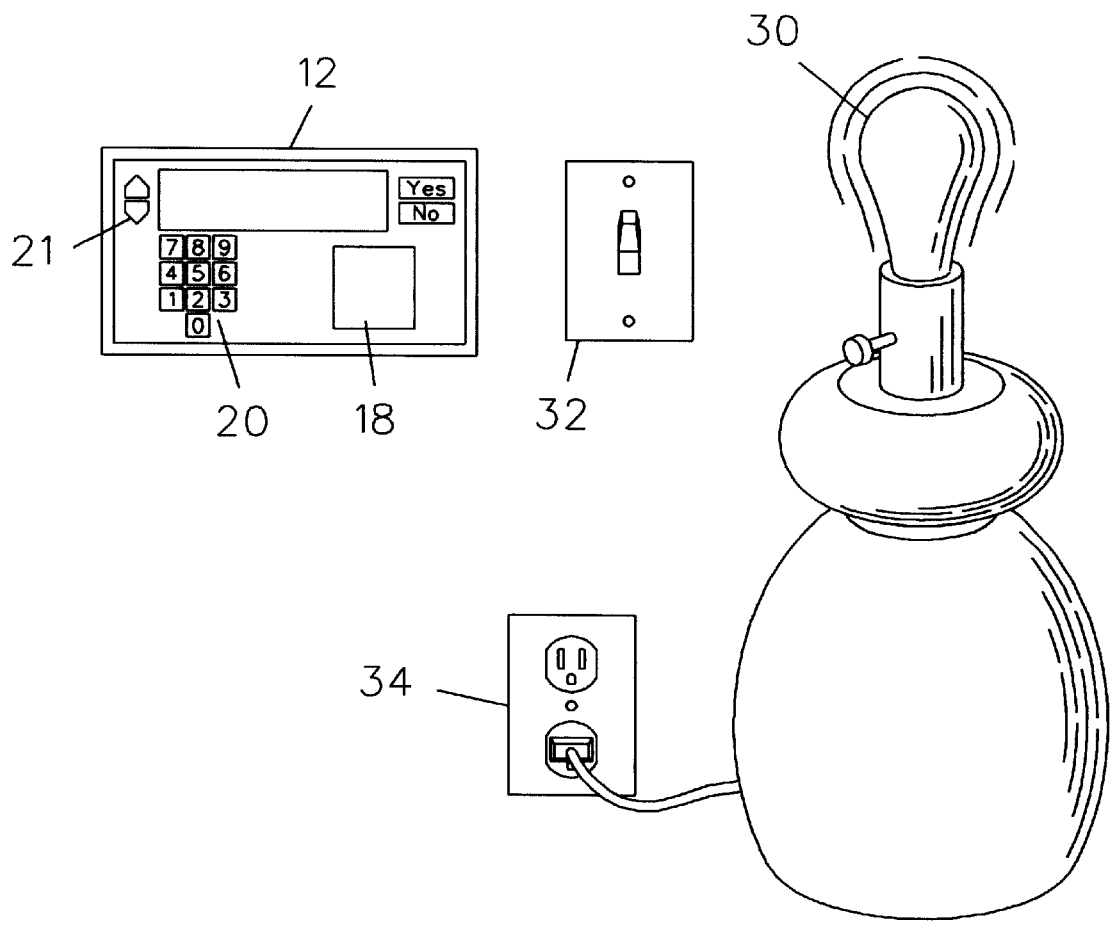
FIG. 2 is a perspective view of a control unit of the system as in FIG. 1 with an electric light being partially energized thereby.
Figure 3:
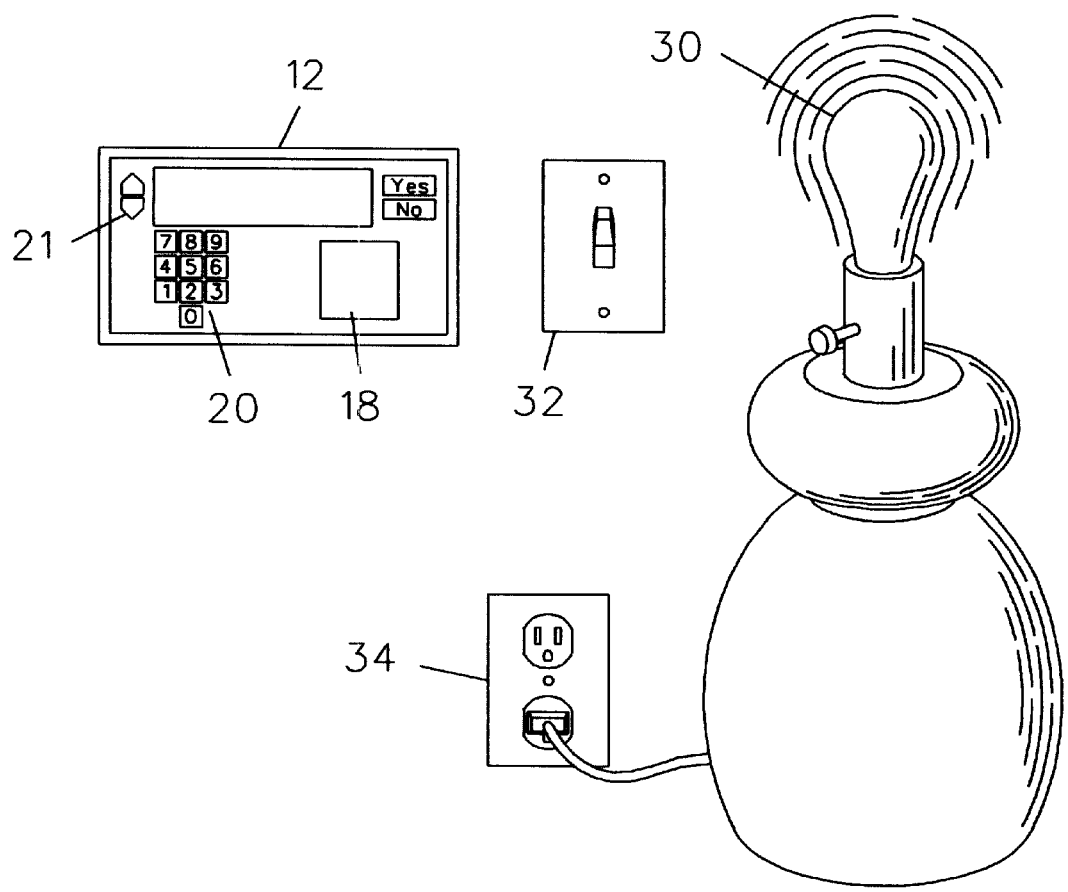
FIG. 3 is another perspective view of the control unit of the system as in FIG. 1 with an electric light being completely energized thereby.
Figure 4:
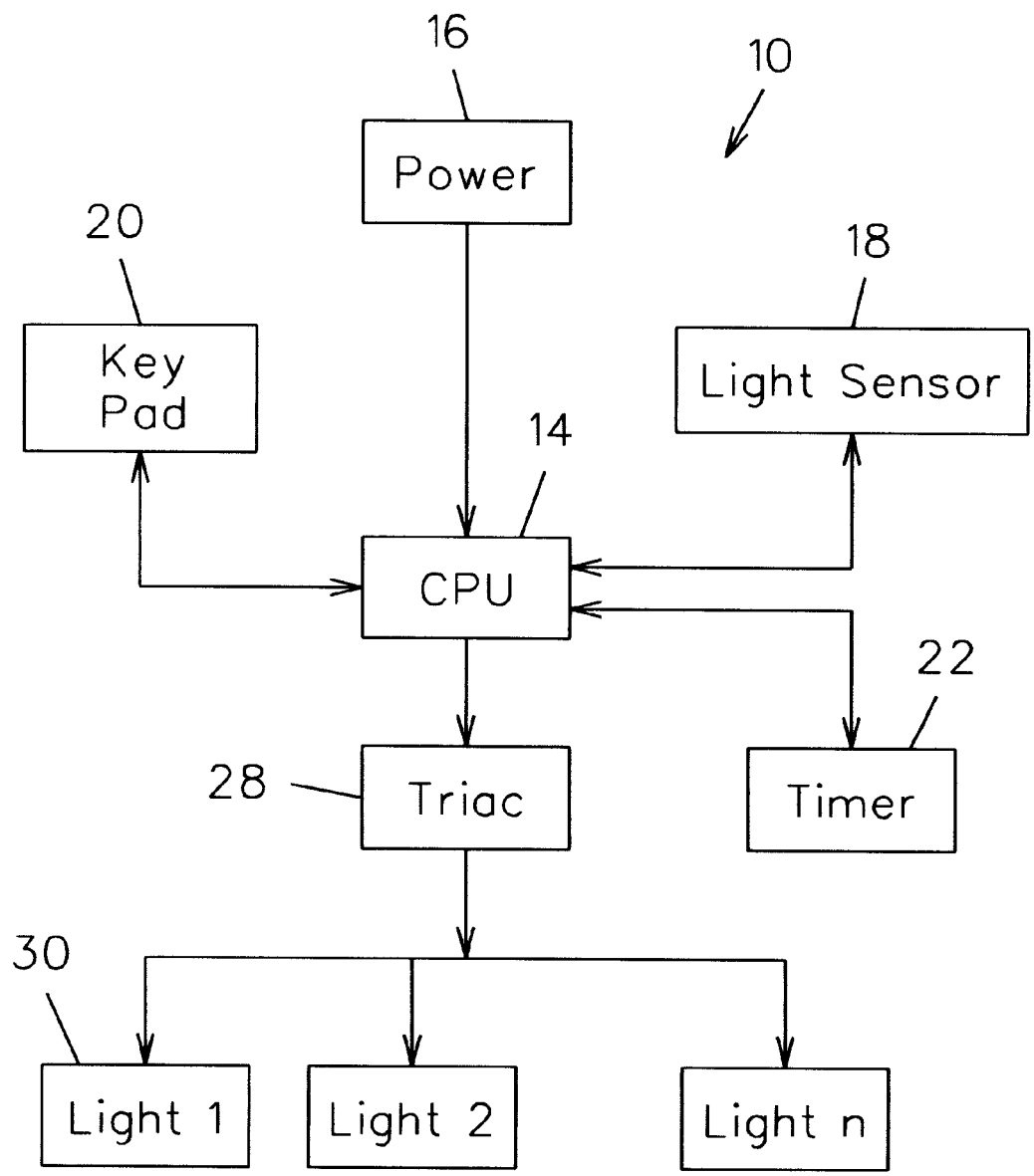
FIG. 4 is a block diagram of the lighting control system as in FIG. 1.

14 is mounted within the control unit 12 and is electrically connected upon installation to an electrical power source 16 (FIG. 4). In other words, the CPU 14 is directly connected to an electrical wire in the wall although a control unit connected to AC electrical power at a wall receptacle would also be suitable.

The control unit 12 further includes a light sensor 18 positioned on an outer surface thereof (FIG. 2) for sensing the total amount of light within the room or lighting zone wherein the control unit 12 is mounted. The light sensor 18 measures the total amount of natural and artificial light in lumens. The light sensor 18 is electrically connected to the CPU 14 for periodically delivering sensed light measurements to the CPU 14 (FIG. 4).

Figure 6:
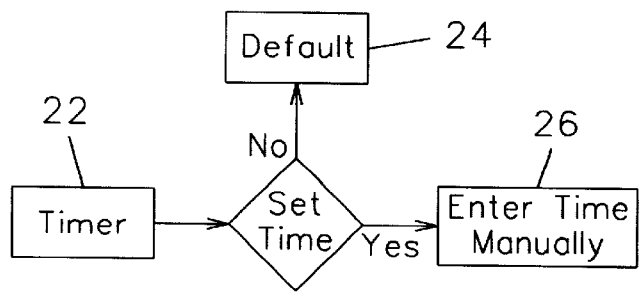
FIG. 6 is a flowchart showing the logic utilized by the timer component.

The control unit 12 further includes a keypad 20 (FIG. 2) which is electrically connected to the CPU 14 for allowing a user to enter certain control values. The CPU 14 includes a memory capable of storing various default or user-defined control parameters, such as the total amount of light to be maintained within a lighting zone. The control unit 12 also includes a timer component 22 positioned therein and electrically connected to the CPU 14. The timer 22 is adapted to actuate the CPU 14 at a predetermined time, the predetermined time being a preset default time 24 or, in conjunction with the keypad 20, a user-defined time 26 (FIG. 6).

The CPU 14 is electrically connected to electric lights 30 that artificially illuminate a lighting zone (FIG. 4). This electrical connection would be directly hardwired to respective light fixtures or to respective electrical receptacles 34, depending, on the particular type of lighting employed in the lighting zone. Of course, it is also possible that the CPU 14 could be electrically connected to a single electrical wire that simultaneously feeds all of the respective light fixtures and receptacles with electricity.

The CPU 14 is programmed to allow a predetermined initial amount of current to flow from the main electrical power source 16 to the light fixtures 30 and then to allow more or less current to flow therebetween according to the sensed light measurements received from the light sensor 18. More particularly, the predetermined initial amount of electricity is allowed to flow from the electrical power source 16 to the light sources 30 when respective light sources are activated (e.g. when a light is switched on with a conventional light switch 32). This initial current flow is very small so that the disadvantage of light bulb failure caused by repetitive immediate energizing of light bulbs to full power is avoided. The CPU 14 further includes comparator circuitry for comparing sensed light measurements with the predetermined light parameter. Based on this comparison, the CPU 14 directs more 40 or less 42 current to be allowed to flow to activated light sources so that the total amount of light within the lighting zone remains generally equal to the predetermined light parameter, whether that parameter is a default or user-defined value.

A triac 28 is also positioned within the control unit 12 and is electrically connected to the CPU 14. The triac 28 is intermediate the CPU 14 and the light sources 30 such that current flowing between the power source 16 and the light sources 30 passes therethrough (FIG. 4). A triac 28 is a type of thyristor which is a known electrical component that acts as a gate to cyclically block and release alternating current (AC) from an electrical appliance such as an electric light. The gate of a thyristor opens and closes at a predetermined rate with the open state becoming gradually longer until the full amount of current as determined by the CPU is being delivered. This blocking and releasing of current appears smooth to the human eye and is often referred to as a "soft-start" relative to a light. Use of a triac 28 in the present invention ensures that the initial delivery of current to an activated light source and all increases in current thereto are gradual so as to maximize bulb life. A triac is a particular type of thyristor capable of controlling AC power.

In use, the control unit 12 of the lighting control system 10 is mounted to a wall within a selected lighting zone, the selected lighting zone being a room that is illuminated by both natural and electric light sources. At the time of installation, the CPU 14 within the control unit 12 is electrically connected to a main source of electrical power 16. Default parameters are stored within the CPU memory component relating to the initial amount of current to be delivered to activated light sources as well as a total light level parameter. Using the keypad 20 and selection buttons 21, a user may enter another light level parameter, initial current amount, or timing parameters which are then stored in memory and used by the CPU 14 to control the system. When the CPU 14 is actuated and respective electric light sources 30 within the lighting zone are activated, the CPU 14 enables the predetermined initial amount of current to flow from the main power source 16 to the activated light sources, whether that initial flow of current is a user-defined or default amount.

Figure 5:
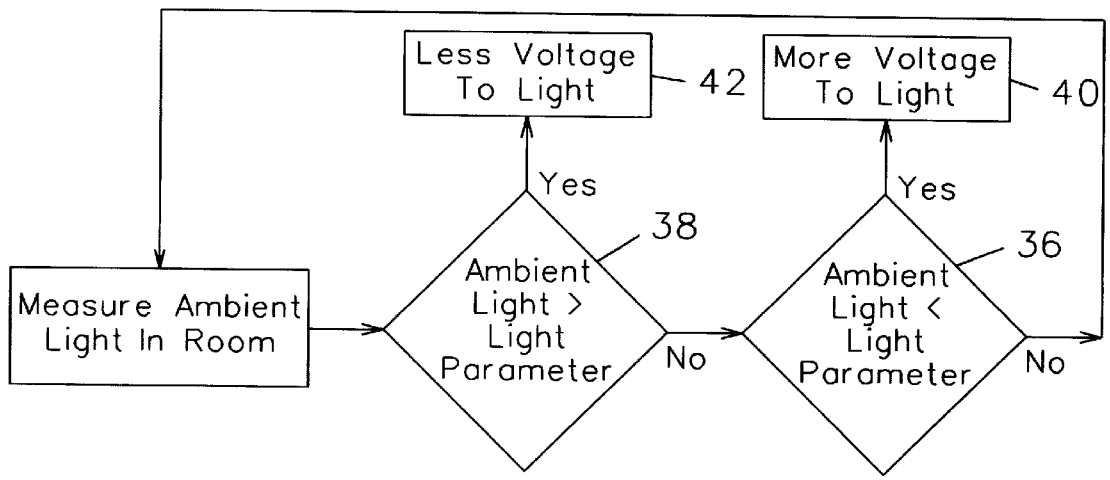
FIG. 5 is a flowchart showing the logic utilized by the central processing unit.

Then, as sensed light level measurements are received from the light sensor 18, comparator circuitry in the CPU 14 compares the sensed light level with the total light level parameter. If the ambient light level within the lighting zone is greater than the light parameter 38, less current is allowed to flow 42 through to the light sources 30 (FIG. 5). Conversely, if the measured light level within the lighting zone is less than the light parameter 36, then more current is allowed to flow 40 through to the activated light sources 30. In any case, current flows through the triac 28 such that it is gradually delivered to the light sources (FIG. 4).

Accordingly, the lighting control system 10 maintains a predetermined level of light within a lighting zone by increasing or decreasing the degree to which electric lights 30 positioned therein are energized. The useful life of respective light bulbs is maximized by gradually energizing the lights and, even then, only to the necessary degree.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A lighting control system for maintaining a predetermined light level within a lighting zone that is partially illuminated by natural light and partially illuminated by at least one electric light source, said system comprising:

a control unit having a central processing unit (CPU) positioned therein and electrically connected to an electrical power source and to said at least one electric light source, said CPU being adapted to store said predetermined light level and to deliver a predetermined initial amount of current to said at least one electric light source when said electric light source is activated;

a sensor for sensing the level of light within said lighting zone, said sensor being electrically connected to said CPU and adapted to provide a sensed light level to said CPU;

means in said CPU for comparing said sensed light level with said predetermined light level; and wherein said CPU is adapted to deliver an increased amount of current from said power source to said at least one electric light source if said sensed light level is less than said predetermined light level.

2. The lighting control system as in claim 1 further comprising a thyristor electrically connected to said CPU capable of cyclically blocking and releasing said predetermined initial amount of current at a predetermined rate such that said at least one electric light source is gradually energized by said predetermined initial amount of current.

3. The lighting control system as in claim 2 wherein said thyristor is a triac.

4. The lighting control system as in claim 1 wherein said CPU is adapted to deliver a decreased amount of current to said at least one electric light source if said sensed light level is greater than said predetermined light level.

5. The lighting control system as in claim 4 further comprising a thyristor capable of cyclically blocking and releasing said decreased amount of current to said at least one electric light source at a predetermined rate such that said at least one electric light source gradually receives said decreased amount of current.

6. The lighting control system as in claim 5 wherein said thyristor is a triac.

7. The lighting system as in claim 1 wherein said control unit includes a keypad electrically connected to said CPU, whereby said predetermined light level is defined by a user.

8. The lighting control system as in claim 7 further comprising a timer positioned in said control unit and electrically connected to said CPU, said timer adapted to energize said CPU at a user-selected time and adapted to set said predetermined initial amount of current to be delivered to said at least one electric light source when said CPU is energized.

9. The lighting control system as in claim 1 wherein said power source is an AC electrical outlet.

10. A lighting control system for maintaining a predetermined light level according to a light level parameter within a lighting zone that is partially illuminated by a natural light source and partially illuminated by at least one electric light source, said system comprising:

a control unit having a central processing unit (CPU) positioned therein and electrically connected to an electrical power source and to said at least one electric light source, said CPU being adapted to store said light level parameter and to deliver an initial amount of current from said power source to said at least one electric light source when said electric light source is activated;

a sensor for sensing a level of light within said lighting zone, said sensor being electrically connected to said CPU and adapted to provide a sensed light level to said CPU;

a comparator circuit in said CPU for comparing said sensed light level with said light level parameter; and wherein said CPU is adapted to deliver an increased amount of current from said power source to said at least one electric light source if said sensed light level is less than said light level parameter;

a thyristor electrically connected to said CPU and adapted to cyclically block and release said predetermined initial amount of current and said increased amount of current at a predetermined rate such that said at least one electric light source is gradually energized by said predetermined initial amount of current and said increased amount of current.

11. The lighting control system as in claim 10 wherein:

said CPU is adapted to deliver a decreased amount of current from said power source to said at least one electric light source if said sensed light level is greater than said predetermined light level;

said thyristor is adapted to cyclically block and release said decreased amount of current at a predetermined rate such that said at least one electric light source gradually receives said decreased amount of current.

12. The lighting control system as in claim 10 wherein said thyristor is a triac.

13. The lighting control system as in claim 10 wherein said control unit includes a keypad electrically connected to said CPU, whereby said light level parameter indicative of said predetermined light level may be input by a user.

14. The lighting control system as in claim 10 further comprising a timer positioned in said control unit and electrically connected to said CPU, said timer adapted to activate said CPU at a user-selected time and adapted to set said predetermined initial amount of current to be delivered to said at least one electric light source when said CPU is energized.

15. The lighting control system as in claim 10 wherein said power source is an AC electrical outlet.

16. The lighting control system as in claim 10 wherein said sensed light level is a measurement representing a total amount of natural and artificial light within said lighting zone.

17. A method of controlling the total level of light within a lighting zone that is partially illuminated by a natural light source and partially illuminated by an electric light source, comprising:

(a) delivering a predetermined initial amount of current from an electric power source to said electric light source when said electric light source is activated;

(b) sensing a level of light within said lighting zone;

(c) comparing said sensed light level with a predetermined light parameter;

(d) delivering an increased amount of current from said electric power source to said electric light source when said sensed light level is less than said light parameter;

(e) delivering a decreased amount of current from said electric power source to said electric light source when said sensed light level is more than said light parameter; and (f) repeating steps (b) through (e) until said electric light source is deactivated.

18. The method as in claim 17 wherein said step of delivering said predetermined initial amount of current includes the step of cyclically blocking and releasing said predetermined initial amount of current at a predetermined rate such that said electric light source is gradually energized.

19. The method as in claim 17 wherein said step of delivering an increased amount of current includes the step of cyclically blocking and releasing said increased amount of current such that said increased amount of current is gradually delivered to said electric light source.

20. The method as in claim 17 wherein said step of delivering a decreased amount of current includes the step of cyclically blocking and releasing said decreased amount of current such that said decreased amount of current is gradually delivered to said electric light source.

* * * * *